US008411692B2

(12) United States Patent
Patil et al.

(10) Patent No.: US 8,411,692 B2
(45) Date of Patent: Apr. 2, 2013

(54) MULTI-HOP HETEROGENEOUS WIRELESS DEVICE FEATURE SHARING

(75) Inventors: Abhishek Patil, San Diego, CA (US); Xiangpeng Jing, Jersey City, NJ (US); Aixin Liu, San Diego, CA (US); Djung Nguyen, San Diego, CA (US)

(73) Assignee: Sony Corporation, Tokyo (JP)

( * ) Notice: Subject to any disclaimer, the term of this patent is extended or adjusted under 35 U.S.C. 154(b) by 323 days.

(21) Appl. No.: 12/869,150

(22) Filed: Aug. 26, 2010

(65) Prior Publication Data

US 2012/0051340 A1 Mar. 1, 2012

(51) Int. Cl.
*H04L 12/56* (2006.01)

(52) U.S. Cl. ......... 370/401; 370/400; 370/465; 370/466

(58) Field of Classification Search ........................ None
See application file for complete search history.

(56) References Cited

U.S. PATENT DOCUMENTS 6,938,080 B1 * 8/2005 Kahveci et al. ............... 709/223
7,046,618 B2 5/2006 Santhoff et al.
7,233,602 B2 6/2007 Chen et al.
7,333,829 B2 2/2008 Malone et al.
7,474,615 B2 1/2009 Pirzada et al.
7,664,081 B2 2/2010 Luoma et al.
8,131,859 B2 * 3/2012 Fujii et al. ..................... 709/228
8,165,102 B1 * 4/2012 Vleugels et al. .............. 370/338
8,171,149 B2 * 5/2012 Imae ............................ 709/229
8,223,730 B2 * 7/2012 Hupp et al. ................... 370/338
8,234,247 B2 * 7/2012 Shin et al. ..................... 707/634
8,244,892 B2 * 8/2012 Carreel et al. ................ 709/230
2002/0037004 A1 * 3/2002 Bossemeyer et al. ......... 370/356
2005/0128958 A1 6/2005 Hamdan
2007/0112939 A1 * 5/2007 Wilson et al. ................ 709/219
2007/0127386 A1 6/2007 Joshi et al.
2009/0086664 A1 4/2009 Wu
2009/0181653 A1 7/2009 Alharayeri

OTHER PUBLICATIONS

International Search Report and Written Opinion, corresponding PCT application PCT/US2011/044710, dated Dec. 12, 2011, pp. 1-11.
Anonymous, “Bluetooth and WLAN Interconnection?” Nokia Forum, Developer Discussion Boards, May 2002, p. 1.
Anonymous, “Bluetooth/Wi-Fi Bridge,” Half bakery, May 18, 2004, pp. 1 and 2.

* cited by examiner

*Primary Examiner* — Donald Mills
(74) *Attorney, Agent, or Firm* — Miller Patent Services; Jerry A. Miller

(57) ABSTRACT

Available features of each of a group of wireless devices accessible over one of a group of different wireless communication protocol interfaces of a first wireless bridging computing device are registered for sharing. A request for use of an available feature of a first wireless device over a first wireless communication protocol interface is received from a second wireless device over a second wireless communication protocol interface. In response to the request, use of the requested available feature of the first wireless device by the second wireless device is facilitated over the first wireless communication protocol interface and the second wireless communication protocol interface. This abstract is not to be considered limiting, since other embodiments may deviate from the features described in this abstract.

47 Claims, 5 Drawing Sheets

300

START (302)

REGISTER AVAILABLE FEATURES OF EACH OF A PLURALITY OF WIRELESS DEVICES ACCESSIBLE VIA ONE OF A PLURALITY OF DIFFERENT WIRELESS COMMUNICATION PROTOCOL INTERFACES OF A FIRST WIRELESS BRIDGING COMPUTING DEVICE (304)

RECEIVE A REQUEST FOR USE OF AN AVAILABLE FEATURE OF A FIRST WIRELESS DEVICE VIA A FIRST WIRELESS COMMUNICATION PROTOCOL INTERFACE FROM A SECOND WIRELESS DEVICE VIA A SECOND WIRELESS COMMUNICATION PROTOCOL INTERFACE (306)

FACILITATE USE OF THE REQUESTED AVAILABLE FEATURE OF THE FIRST WIRELESS DEVICE BY THE SECOND WIRELESS DEVICE VIA THE FIRST WIRELESS COMMUNICATION PROTOCOL INTERFACE AND THE SECOND WIRELESS COMMUNICATION PROTOCOL INTERFACE IN RESPONSE TO THE REQUEST (308)

MULTI-HOP HETEROGENEOUS WIRELESS DEVICE FEATURE SHARING

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Wireless technologies include wireless personal area network (PAN), wireless local area network (LAN), and wireless wide area network (WAN) technologies. Portable electronic devices may include a wireless radio for receipt of information or communication purposes. Point-to-point wireless radios may include wireless universal serial bus (USB) using ultra-wide band (UWB) technology in devices, such as wireless video camcorders and external hard drives, IEEE 802.11 based proprietary radios in wireless speakers, wireless high definition multimedia interface (HDMI) radio in Blu-ray players and high definition televisions (HDTVs), among others. Certain wireless devices may include multiple different heterogeneous wireless radios that each supports a different feature of the wireless device. For example, a wireless device may include a Bluetooth® wireless radio that supports a handsfree headset, a wireless fidelity (WiFi) radio (e.g., IEEE 802.11b/g/n) that supports local Internet access via an access point, and a third generation (3G) wireless radio (e.g., high speed data packet access (HSDPA)) that supports voice and mobile data services. As such, each such wireless radio provides communication capabilities for a different feature of the wireless device.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
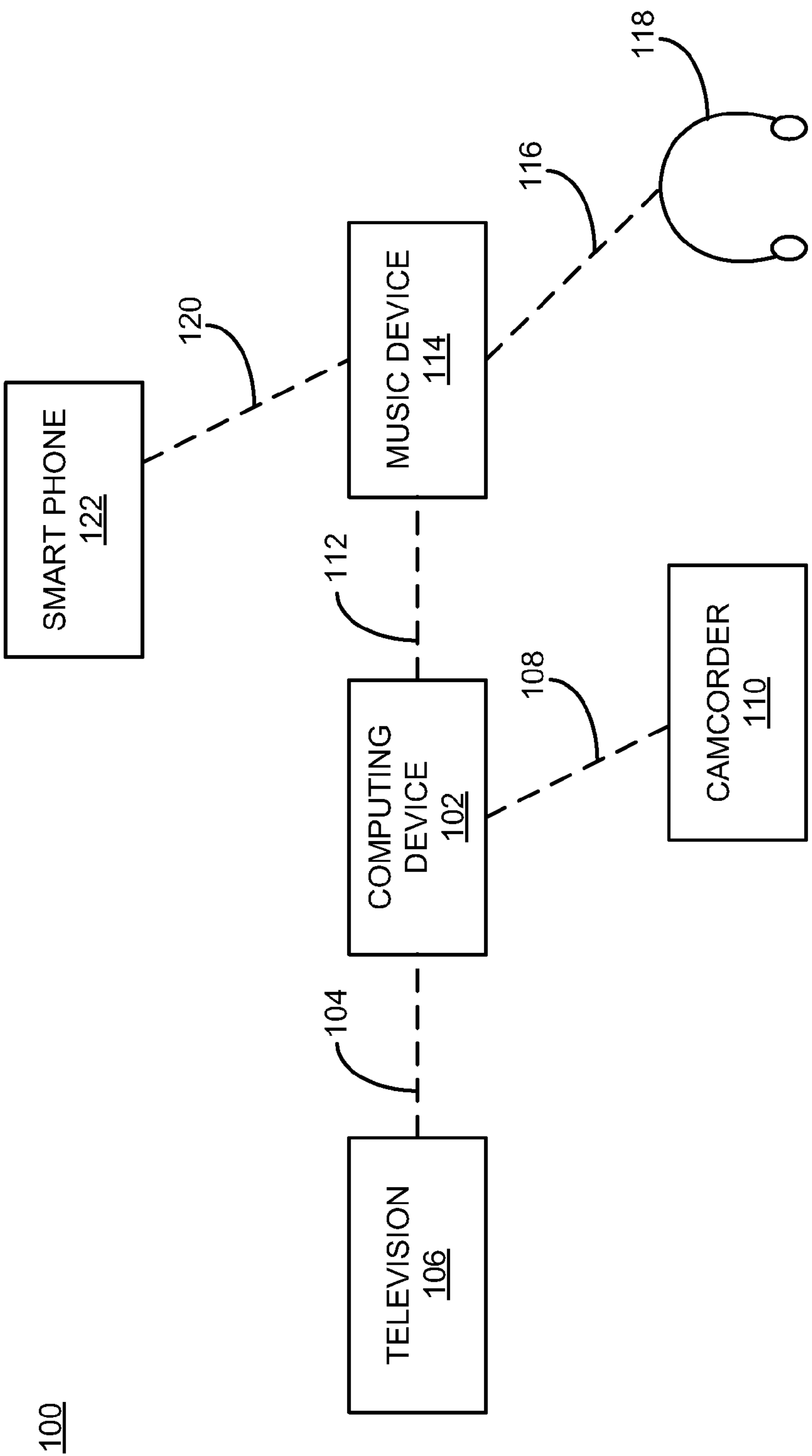
FIG. 1 is a block diagram of an example of an implementation of a system that provides automated multi-hop heterogeneous wireless device feature sharing consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system having one or more processors.

The term "program," as used herein, may also be used in a second context (the above definition being for the first context). In the second context, the term is used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides automated multi-hop heterogeneous wireless device feature sharing. The automated multi-hop heterogeneous wireless device feature sharing described herein allows wireless devices that are accessible via a wireless bridging computing device to register and share available features with other wireless devices that are accessible via the wireless bridging computing device.

Wireless devices may also utilize available features that are registered via the wireless bridging computing device independently of differences between wireless radio interfaces of the feature providing and the feature consuming devices.

Available features that may be shared between heterogeneous wireless devices include, among other things, displays, storage devices, audio output devices, user input devices, and telephone and other communication capabilities. It is understood that sharing of many other features is possible and all are considered within the scope of the present subject matter.

Registration of available features of accessible wireless devices by a wireless bridging computing device may be performed, for example, in response to feature discovery activities, such as during a power on or scheduled feature discovery event. A feature discovery query may be issued to each accessible wireless device to request available features for sharing, and a response that lists the available features the device is configured to share or capable of sharing may be returned. Registration of available features of accessible wireless devices by a wireless bridging computing device may be performed in response to receipt of a registration message from an accessible wireless device that announces available features that may be shared.

In response to registration of available features of a wireless device, the wireless bridging computing device may publish the available features for query and use by other accessible wireless devices. Alternatively, the wireless bridging computing device may publish available features by sending registration publication messages to the other accessible wireless devices to announce the available services.

Use of a feature of one wireless device by another wireless device may be termed herein on occasion as "consumption" of a feature or a wireless device may be indicated to "consume" a feature. Additionally, a device that provides a feature for consumption and use may be termed a feature "producer" or "provider," or may be indicated to "offer" a feature for consumption and use by another wireless device.

Registration of available features may include creating an available feature list that identifies the features available for sharing with other accessible wireless devices. The wireless bridging computing device may further create a feature access profile for each other wireless device based upon the available features of other feature offering devices. One or more feature access profiles for feature consuming devices may reference features that are available as specified within any given available feature list. Further, each device feature access profile may reference features specified as available in one or more available features lists. Accordingly, there is a bidirectional one-to-one or one-to-many relationship between available features lists and device feature access profiles, as appropriate for a given implementation.

The available feature list(s) and feature access profile(s) may each include a number of wireless hops to each available feature from the wireless bridging computing device that provides or publishes the available features, respectively. It should be noted that the wireless bridging computing device maintains each of the available feature list(s) and feature access profile(s). As such, a number of hops may be identical between each respective available feature list and the one or more feature access profiles that reference any given feature of an available feature list.

Registration of available features of accessible wireless devices may also include classifying the available features offered by each wireless device. An available feature list may be generated for each wireless device that lists the available features offered by each accessible wireless device. A device type may be associated with each separate available feature list to identify a type of device that provides the available features.

When publishing available features, this device type may be utilized for classification or reclassification (e.g., modification) of available features of other accessible wireless devices. For example, where it is determined that a classification description of an available feature of a first wireless device, such as a music player device, includes a Bluetooth® headset classification description for an available feature, and it is determined that a second wireless device includes a wireless telephone device, the Bluetooth® headset classification description may be modified in the available feature access profile for the wireless telephone device to a handsfree headset classification description. As such, the wireless bridging computing device transforms the classification of available feature classification description based upon a device type of a feature consuming device. A user of the wireless telephone device may then browse the available features, see that the handsfree headset is available, and select the available handsfree headset feature for use with the wireless telephone device via the music player device and the wireless bridging computing device. Many other possibilities exist for feature sharing and reclassification of available features and all are considered within the scope of the present subject matter.

A wireless bridging computing device may also filter the available features published to each wireless device based upon the device type of each wireless device to include only those available features useable by each wireless device. Filtering the available features may be based, for example, upon bandwidth requirements for the feature. The filtering of the available features may also be based, for example, upon bandwidth availability of wireless radios within the available feature chain between the providing wireless device and the consuming wireless device. The filtering of the available features may further be based upon signal strength or other factors associated with the wireless hops between devices. The available feature lists and feature access profiles of the respective devices may be augmented to include this or other additional information to allow selection of available features based upon these additional selection criteria.

Multiple wireless devices within an available features chain may perform as wireless bridging computing devices to transform wireless communication protocols for consumption of available services that are accessible by each respective wireless bridging computing device. Accordingly, wireless bridging computing devices may provide extended wireless range between wireless devices and protocol conversion between otherwise incompatible wireless radios for feature sharing between the wireless devices that are accessible across a given available feature chain.

Bridging available features for multi-hop heterogeneous wireless device feature sharing between multiple heterogeneous wireless radios may include a variety of techniques, as appropriate for each such heterogeneous wireless radio. For example, bridging may include directly bridging wireless communications between heterogeneous radios of a first wireless device and a second wireless device. Bridging may also include forwarding of data packets associated with a requested available feature between the first wireless device and the second wireless device. Forwarding may included forwarding data packets (e.g., packet forwarding) via a virtual Internet protocol (IP) bridging network layer of the bridging computing device operating above one or more IP stacks and below a transmission control protocol (TCP) stack associated with respective one or more wireless radio interfaces. For non-IP wireless radio interfaces, communications associated with the requested available feature may be coordinated between the providing wireless device and the consuming wireless device. This coordination may be performed, for example, via a helper protocol conversion layer or helper application of the wireless bridging computing device. Where the heterogeneous wireless radios include asymmetric links (e.g., links that operate at different speeds), the bridging may include performing link speed control, buffering control, and queue control to manage use of the requested available feature between the asymmetric links.

The wireless bridging computing device further provides a two-way communications interface between a first wireless device and a second wireless device to allow two-way feature sharing. Providing a two-way communications interface may include allocating multiple prioritized outbound message queues for each wireless communication protocol interface of the wireless bridging computing device. The outbound message queues may be prioritized, for example, based upon traffic type (e.g., audio and/or video traffic may require higher priority than data storage traffic). Message traffic management may be performed via the multiple prioritized outbound message queues for each wireless communication protocol interface.

Multiple uni-directional or bi-directional feature sharing sessions may be active concurrently between two or more pairs of wireless devices. Pairing of wireless devices may be performed in response to initial or ongoing registration activities. Pairing of wireless devices may also be performed in response to feature requests from wireless devices that request consumption of an available feature.

Many other possibilities for automated multi-hop heterogeneous wireless device feature sharing exist and all are considered within the scope of the present subject matter. The following description provides certain non-limiting examples.

Turning now to FIG. 1, FIG. 1 is a block diagram of an example of an implementation of a system 100 that provides automated multi-hop heterogeneous wireless device feature sharing. A computing device 102 communicates via a WiFi wireless connection 104 with a television 106. The computing device 102 also communicates via a UWB wireless connection 108 with a camcorder 110. The computing device 102 additionally communicates via a WiFi wireless connection 112 with a music device 114. As such, for purposes of the present example, the computing device 102 includes both WiFi and UWB interfaces and may bridge communications between the camcorder 110, the music device 114, and the television 106 to provide automated multi-hop heterogeneous wireless device feature sharing.

The music device 114 communicates via a Bluetooth® wireless connection 116 with a Bluetooth® headset 118. The music device 114 also communicates via a WiFi wireless connection 120 with a smart phone 122. As such, for purposes of the present example, the music device 114 includes both WiFi and Bluetooth® interfaces and may bridge communications between the computing device 102, the Bluetooth® headset 118, and the smart phone 122 to provide automated multi-hop heterogeneous wireless device feature sharing.

The computing device 102 and the smart phone 122 may access one or more web-based servers (not shown) for information via one or more networks (also not shown), such as the Internet. Many other possibilities exist for wireless devices and interconnection, and all are considered within the scope of the present subject matter.

For purposes of the present example, each of the computing device 102, the music device 114, and the smart phone 122 may operate as wireless bridging computing devices. As wireless bridging computing devices, each of the computing device 102, the music device 114, and the smart phone 122 may facilitate use of requested available features of any of the wireless devices shown within FIG. 1 and accessible by other wireless devices by managing and controlling multi-hop communications bridging between the respective heterogeneous radio interfaces.

It should also be noted that the computing device 102 may include any computing device capable of processing information as described above and in more detail below. For example, the computing device 102 may include devices such as a personal computer (e.g., desktop, laptop, etc.) or a handheld device (e.g., cellular telephone, personal digital assistant (PDA)), email device, or any other device capable of processing information as described in more detail below.

Additionally, the music device 114 may include any device capable of processing information, as described above and in more detail below, and that is additionally capable of storing, playing, and sharing music. For example, the music device 114 may include an iPod®, MP3 player or other music device. The smart phone 122 may include any device capable of processing information, as described above and in more detail below, and that is capable of placing telephone calls via a wired or wireless telephone or Internet protocol (IP)-based network.

For purposes of the present example, it is assumed that certain of the illustrated devices include at least one feature that may be shared with at least one other wireless device. For example, the computing device 102 may include and share a storage space feature (e.g., hard drive, floppy disk drive, a memory stick, or other storage). This storage feature may be used, for example, by the camcorder 110 for bulk storage of digital images taken by the camcorder 110. The smart phone 122 may include and share a wireless telephone feature for use by a user of the music device 114 or the computing device 102. The camcorder 110 may also provide storage for images downloaded from the Internet through one of the computing device 102 or the smart phone 122, and may also provide a video capture interface for use by the computing device 102 or the smart phone 122 for video conferencing.

As described above, a wireless bridging computing device as described herein may register accessible wireless devices for feature sharing with other wireless devices. Available features may also be published to the other wireless devices so that they may consume (e.g., use) available features. A feature access profile may be created for each such other wireless device based upon available features that are accessible via the wireless bridging computing device. Further, an available feature list may be generated for each wireless device that lists the available features offered by each feature providing accessible wireless device.

The following Table 1 illustrates an available features list that identifies example available features for the camcorder 110 upon registration of the camcorder 110 with the computing device 102.

TABLE 1

Example Available Features of the Camcorder 110

| Feature Classification (Name) | Device Name | Description |
|---|---|---|
| Display Device | Local | 2" × 3" |
| Storage Device | Local | 32 MB |
| Camera | Local | 5 Mega Pixel |

As can be seen from the example Table 1, the camcorder 110 provides two available features for sharing with other wireless devices. The first feature is a local display device, the second feature is a local storage device, and the third feature is a local camera. Because all of the features are local to the camcorder, a number of hops to any associated feature is not shown. The "Description" column within Table 1 provides information that may be used, as described in more detail below, for filtering or classifying the available features for publication to other wireless devices.

As described in more detail below, additional information, such as a number of hops, a bandwidth of any available communications link feature, and other information may be included within either an available feature list or a feature access profile without departure from the scope of the present subject matter. However, for ease of description, these additional fields may be omitted within certain of the examples that follow.

It is further understood that each device that registers with a device, such the computing device 102, may provide its features that are available for sharing. For purposes of the present example, it is assumed that the television 106, the camcorder 110, and the music device 114 have registered for feature sharing with the computing device 102. The present example further shows that the computing device 102 has formed a registration table that lists all available features of all registered wireless devices. The computing device may further maintain the separate available feature lists for each registered wireless device, as described above, to expedite processing of any changes to available features (e.g., where a storage device becomes full).

The following Table 2 illustrates a registration table that identifies example available features accessible via the computing device 102 for registered devices.

TABLE 2

Example Registration Table for the Computing Device 102

| Feature Classification (Name) | Device Name | Number of Hops | Wireless Protocol | Bridging Device |
|---|---|---|---|---|
| Display Device | Television 106 | 1 | WiFi | N/A |
| Display Device | Local | 0 | N/A | N/A |
| Display Device | Smart Phone 122 | 2 | WiFi/WiFi | Music Device 114 |
| Display Device | Camcorder 110 | 1 | UWB | N/A |
| Storage Device | Camcorder 110 | 1 | UWB | N/A |
| Music Device | Music Device 114 | 1 | WiFi | N/A |
| Audio Headset | Bluetooth Headset 118 | 2 | WiFi/ Bluetooth ® | Music Device 114 |
| Telephone | Smart Phone 122 | 2 | WiFi/WiFi | Music Device 114 |
| Wireless Internet Access | Access Point (not shown) | 1 | N/A | N/A |
| Wireless Internet Access | Smart Phone 122 | 2 | WiFi/WiFi | Music Device 114 |

As can be seen from the example Table 2, the computing device 102 has registered all five other devices illustrated within FIG. 1 and has access to the features available at each device. Each device that is registered for feature sharing with the computing device 102 is described with a feature classification (e.g., name) within the first column of Table 2. The second column of Table 2 includes a device name for the registered device that provides the respective features. The third column of Table 2 identifies a number of wireless hops to access the respective features. As such, as can be seen from the seventh and eighth row of Table 2, the audio headset and the telephone feature classifications may be accessed via two (2) wireless hops from the computing device 102. The fourth column of Table 2 identifies the wireless protocols utilized to access the respective features. As such, feature selection may be based upon bandwidth requirements and bandwidth availability of the respective connection(s). The fifth column identifies a bridging device utilized to access any respective features with a number of hops greater than one (1).

It should be noted that certain information, such as the size of the display device and the storage device of the camcorder 110 have been omitted from the example Table 2. This omission is for ease of illustration purposes. However, it is understood that a wireless bridging computing device, such as the computing device 102, may also filter either description information or entire features from a registration as appropriate for a given implementation.

The following Table 3 illustrates a registration table for the music device 114.

TABLE 3

Example Registration Table for the Music Device 114

| Feature Classification (Name) | Device Name | Number of Hops | Wireless Protocol | Bridging Device |
|---|---|---|---|---|
| Display Device | Television 106 | 2 | WiFi/WiFi | Computing Device 102 |
| Display Device | Computing Device 102 | 1 | WiFi | N/A |
| Display Device | Smart Phone 122 | 1 | WiFi | N/A |
| Storage Device | Camcorder 110 | 2 | WiFi/UWB | Computing Device 102 |
| Storage Device | Computing Device 102 | 1 | WiFi | N/A |
| Audio Headset | Bluetooth Headset 118 | 1 | Bluetooth ® | N/A |
| Telephone | Smart Phone 122 | 1 | WiFi | N/A |
| Wireless Internet Access | Computing Device 102 | 2 | WiFi/WiFi | Computing Device 102 |
| Wireless Internet Access | Smart Phone 122 | 2 | WiFi/WiFi | Smart Phone 122 |

As can be seen from Table 3, the music device 114 also has access to features available via each other device within the system 100. Additionally, it is noted that the wireless internet access is listed twice in the last two rows of Table 3 as being two (2) hops away via each path, respectively, through the computing device 102 and the smart phone 122. This represents the fact that each of the computing device 102 and the smart phone 122 will need to access an access point (not shown) or other device to provide the service.

As also described above, features access profiles may be created for each registered wireless device. Each device feature access profile may include features that are usable by a given registered device and that are accessible via a wireless bridging computing device. Available features may be filtered when published to a given device (or feature access profile) to include only available features usable by each such wireless device. Filtering may be based, for example, upon bandwidth requirements for the feature, upon bandwidth availability of wireless radios within the available feature chain, signal strength, size (e.g., storage or display size), or other factors.

Within the present example, it will be assumed that the music device 114 does not utilize an output display. It is also assumed that the smart phone 122 includes the Bluetooth® headset 118. Further, it is assumed that the Bluetooth® headset 118 will be reclassified as a handsfree device within a feature access profile for the smart phone 122 to facilitate ready recognition of the feature by a user of the smart phone 122.

The following Table 4 illustrates an example feature access profile for the music device 114. It is noted that the music device 114 also operates as a wireless bridging computing device within the present example. It will also be presumed that the music device 114 will not be provided with access to the telephone capabilities of the smart phone 122, though this is for ease of illustration purposes only and a music device may be provided with such a feature as appropriate for a given implementation.

TABLE 4

Example Feature Access Profile for the Music Device 114

| Feature Classification (Name) | Device Name | Number of Hops | Wireless Protocol | Bridging Device |
|---|---|---|---|---|
| Storage Device | Camcorder 110 | 2 | WiFi/UWB | Computing Device 102 |
| Storage Device | Computing Device 102 | 1 | WiFi | N/A |
| Audio Headset | Bluetooth Headset 118 | 1 | Bluetooth ® | N/A |
| Wireless Internet Access | Computing Device 102 | 2 | WiFi/WiFi | Computing Device 102 |
| Wireless Internet Access | Smart Phone 122 | 2 | WiFi/WiFi | Smart Phone 122 |

As can be seen from Table 4, the feature access profile for the music device 114 includes storage device features that are accessible, audio output features that are accessible, and wireless internet access features that are accessible. The storage device features may be used for storing music selections, for example, that have been downloaded from one or more servers over the internet via one of the wireless internet access features.

The following Table 5 illustrates an example feature access profile for the smart phone 122.

TABLE 5

Example Feature Access Profile for the Smart Phone 122

| Feature Classification (Name) | Device Name | Number of Hops | Wireless Protocol | Bridging Device |
|---|---|---|---|---|
| Display Device | Television 106 | 2 | WiFi/WiFi | Computing Device 102 |
| Display Device | Computing Device 102 | 1 | WiFi | N/A |
| Display Device | Local | 0 | N/A | N/A |
| Camera | Camcorder 110 | 3 | WiFi/WiFi/UWB | Music Device 114/Computing Device 102 |
| Camera | Local | 0 | N/A | N/A |
| Handsfree Device | Bluetooth Headset 118 | 2 | WiFi/Bluetooth ® | Music Device 114 |
| Wireless Internet Access | Local | 1 | WiFi | N/A |
| Wireless Internet Access | Smart Phone 122/Computing Device 102 | 3 | WiFi/WiFi/WiFi | Smart Phone 122/Computing Device 102 |

As can be seen from Table 5, the smart phone 122 has a feature access profile that includes three display devices including a local display device, and display devices associated with the computing device 102 and the television 106. As such, a user of the smart phone 122 may initiate a teleconference with video output via either the local display device or via one of the possibly larger accessible display devices.

Additionally, the smart phone 122 has access to two camera devices, including a local camera device and a camera associated with the camcorder 110. However, it should be noted that the camcorder 110 requires three (3) hops for data communications. Accordingly, a user of the smart phone 122 may choose to utilize either the local camera or the accessible camera of the camcorder 110 based upon factors such as the resolution of the camcorder, which may be considerably superior to that of the smart phone 122, vs. potential impacts to bandwidth.

It should additionally be noted that the Bluetooth® headset 118 has been reclassified within the feature access profile for the smart phone 122 as a handsfree device. As such, a user of the smart phone 122 may select and utilize the Bluetooth® headset 118 as a handsfree device and utilize that device via the wireless bridging computing device capabilities of the music device 114. Accordingly, for purposes of the present example, it is assumed that the Bluetooth® headset 118 also includes an audio input and that bi-directional audio traffic is managed and controlled via the music device 114 during communication session message bridging activities.

Figure 2:
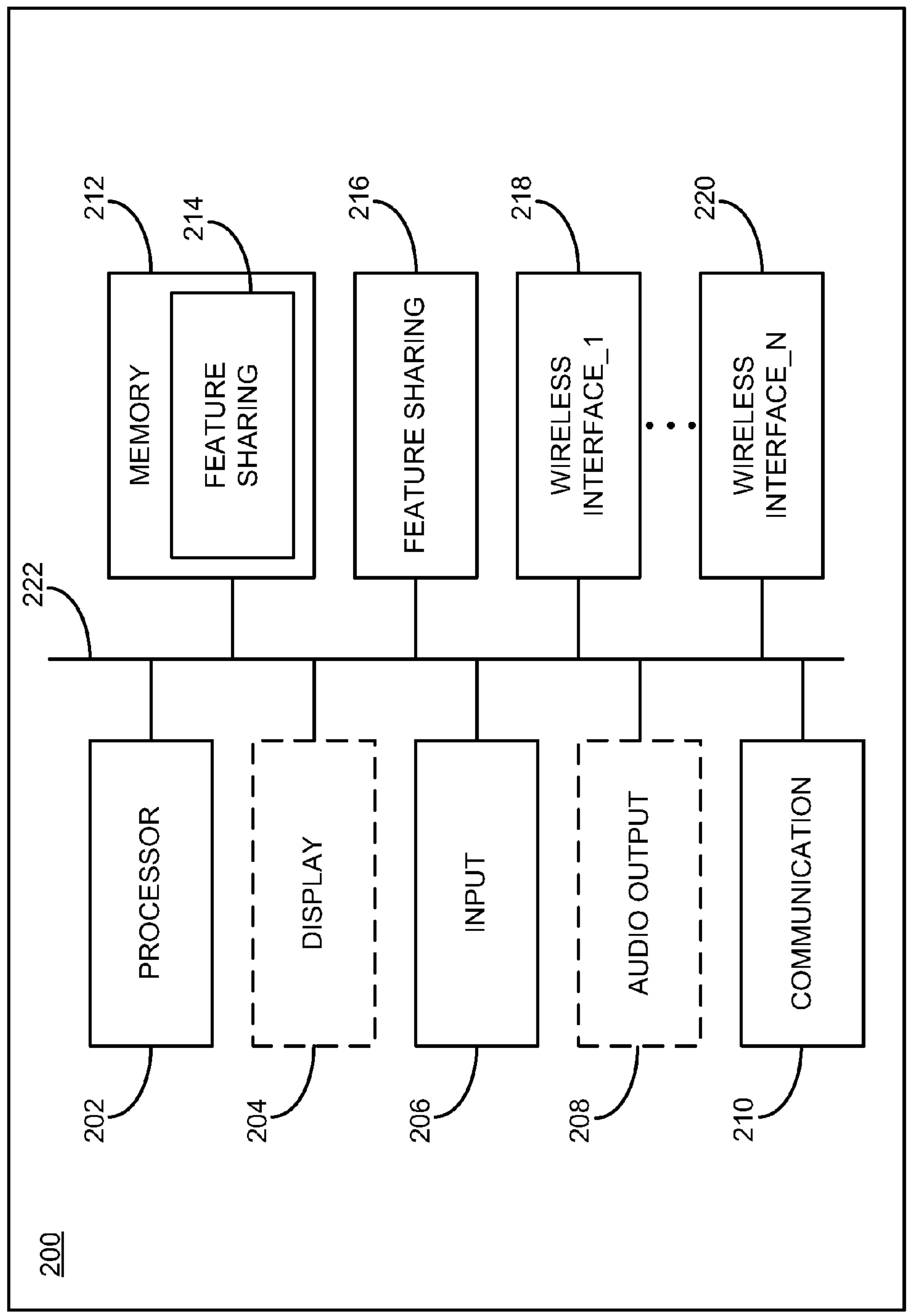
FIG. 2 is a block diagram of an example of an implementation of a core processing module that provides automated multi-hop heterogeneous wireless device feature sharing consistent with certain embodiments of the present invention.

FIG. 2 is a block diagram of an example of an implementation of the core processing module 200 that provides automated multi-hop heterogeneous wireless device feature sharing. The core processing module may form a portion of any device that provides either feature sharing or wireless bridging computing device capabilities as described herein. A processor 202 provides computer instruction execution, computation, and other capabilities within the core processing module 200. A display device 204 provides visual and/or other information to a user of a device that includes the core processing module 200. The display device 204 may include any type of display device, such as a cathode ray tube (CRT), liquid crystal display (LCD), light emitting diode (LED), projection or other display element or panel. It should be noted that the display device 204 is shown in a dashed-line representation to illustrate that it is optional and may be included as appropriate for a given device implementation.

An input device 206 provides input capabilities for the user. The input device 206 may include a mouse, pen, trackball, or other input device. One or more input devices, such as the input device 206, may be used.

An audio output device 208 provides audio output capabilities for the core processing module 200. The audio output device 208 may include a speaker, driver circuitry, and interface circuitry as appropriate for a given implementation. The audio output device 208 is also shown in a dashed-line representation to illustrate that it is optional and may be included as appropriate for a given device implementation. As described above, each device may include certain features that may be shared with other devices. Accordingly, many variations on device features are possible and all are considered within the scope of the present subject matter.

A communication module 210 provides communication capabilities for interaction with the core processing module 200, such as for retrieval of audio and video content via a satellite, cable, the Internet, or other content providers when the core processing module 200 is implemented within a television device, such as the television 106. The communication module 210 may support wired or wireless standards appropriate for a given implementation. Example wired standards include Internet video link (IVL) interconnection within a home network, for example such as Sony Corporation's Bravia® Internet Video Link (BIVL™). Example wireless standards include cellular wireless communication and Bluetooth® wireless communication standards, WiFi, or other standards as described herein and as available for a given implementation. Many other wired and wireless communication standards are possible and all are considered within the scope of the present subject matter.

It should be noted that the communication module 210 is illustrated as a component-level module for ease of illustration and description purposes. It is also understood that the communication module 210 may include any hardware, programmed processor(s), and memory used to carry out the functions of the communication module 210. For example, the communication module 210 may include additional controller circuitry in the form of application specific integrated circuits (ASICs), processors, antenna(s), and/or discrete integrated circuits and components for performing electrical control activities associated with the communication module 210. Additionally, the communication module 210 may include interrupt-level, stack-level, and application-level modules as appropriate. Furthermore, the communication module 210 may include any memory components used for storage, execution, and data processing by these modules for performing processing activities associated with the communication module 210. The communication module 210 may also form a portion of other circuitry described below without departure from the scope of the present subject matter.

A memory 212 includes a feature sharing storage area 214 that stores feature lists and feature access profiles for devices that are registered for feature sharing. As will be described in more detail below, the features sharing information stored within the feature sharing storage area 214 is used to classify, filter, reclassify, and provide features that are available via accessible wireless devices to other accessible wireless devices.

It is understood that the memory 212 may include any combination of volatile and non-volatile memory suitable for the intended purpose, distributed or localized as appropriate, and may include other memory segments not illustrated within the present example for ease of illustration purposes. For example, the memory 212 may include a code storage area, a code execution area, and a data area without departure from the scope of the present subject matter.

A feature sharing module 216 is also illustrated. The feature sharing module 216 provides feature sharing processing for the core processing module 200, as described above and in more detail below. The feature sharing module 216 implements the automated multi-hop heterogeneous wireless device feature sharing of the core processing module 200.

Though the feature sharing module 216 is illustrated as a component-level module for ease of illustration and description purposes, it should be noted that the feature sharing module 216 may include any hardware, programmed processor(s), and memory used to carry out the functions of this module as described above and in more detail below. For example, the feature sharing module 216 may include additional controller circuitry in the form of application specific integrated circuits (ASICs), processors, and/or discrete integrated circuits and components for performing communication and electrical control activities associated with the respective devices. Additionally, the feature sharing module 216 may also include interrupt-level, stack-level, and application-level modules as appropriate. Furthermore, the feature sharing module 216 may include any memory components used for storage, execution, and data processing for performing processing activities associated with the module.

It should also be noted that the feature sharing module 216 may form a portion of other circuitry described without departure from the scope of the present subject matter. Further, the feature sharing module 216 may alternatively be implemented as an application stored within the memory 212. In such an implementation, the feature sharing module 216 may include instructions executed by the processor 202 for performing the functionality described herein. The processor 202 may execute these instructions to provide the processing capabilities described above and in more detail below for the core processing module 200. The feature sharing module 216 may form a portion of an interrupt service routine (ISR), a portion of an operating system, a portion of a browser application, or a portion of a separate application without departure from the scope of the present subject matter.

A wireless interface_1 218 through a wireless interface_N 220 provide multiple wireless interfaces for the core processing module 200. For example, when the core processing module 200 is implemented within the computing device 102 of the example system 100, the wireless interface_1 218 may include a WiFi wireless radio interface and the wireless interface_N 220 may include a UWB wireless interface. Different wireless radio interfaces may be implemented as appropriate for a given implementation of the core processing module 200.

For IP-based communications, the feature sharing module 216 may implement a virtual IP layer. The virtual IP layer may interface with one or more TCP layers for transmission control protocol operations. The virtual IP layer may be located between the one or more TCP layers and an IP stack associated with each of the wireless interface_1 218 through one or more of the wireless interface_N 220. The virtual IP layer may allocate and manage outbound message queues to map communications between one or more heterogeneous radio interfaces represented by the wireless interface_1 218 through the wireless interface_N 220. These message queues may be prioritized based upon traffic type associated with each queue. For example, audio and video traffic may have a higher priority than storage traffic to write to or read from an accessible storage device. For non-IP-based implementations, the feature sharing module 216 may implement protocol conversions between disparate wireless communication protocols associated with each of the wireless interface_1 218 through one or more of the wireless interface_N 220, and perform the other queue allocation and traffic management activities described for these interfaces. Multiply simultaneous or concurrent uni-directional or bi-directional communication sessions may be established and managed. Further, as appropriate for a given implementation, certain of the wireless interface_1 218 through the wireless interface_N 220 may be IP-based wireless interfaces while certain others may be different forms of wireless interfaces (e.g., UWB, Bluetooth®, etc.). As such, multiple uni-directional or bi-directional communication sessions may be established and managed for different types of packetized and non-packetized communication protocols.

The processor 202, the display device 204, the input device 206, the audio output 208, the communication module 210, the memory 212, the feature sharing module 216, and the wireless interface_1 218 through the wireless interface_N 220 are interconnected via one or more interconnections shown as interconnection 222 for ease of illustration. The interconnection 222 may include a system bus, a network, or any other interconnection capable of providing the respective components with suitable interconnection for the respective purpose.

Figure 3:
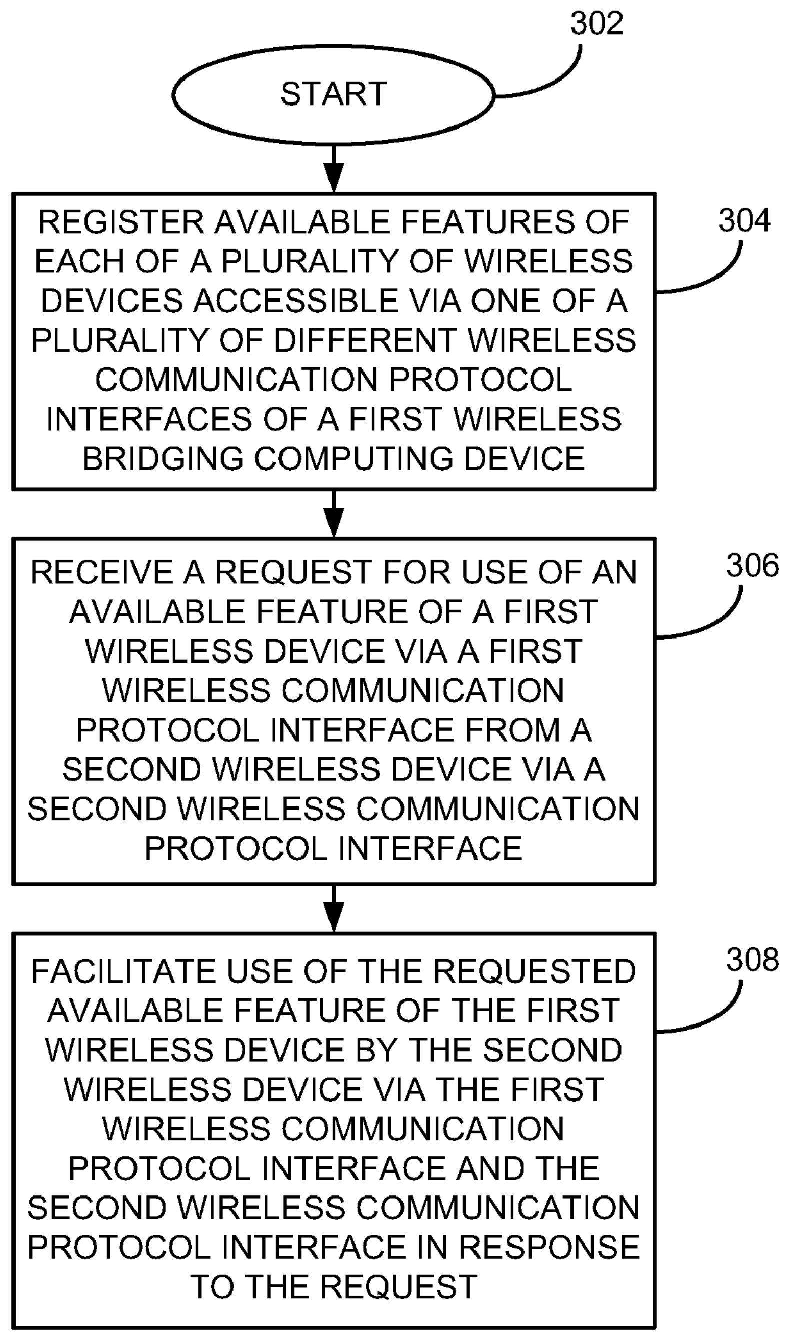
FIG. 3 is a flow chart of an example of an implementation of a process that provides automated multi-hop heterogeneous wireless device feature sharing consistent with certain embodiments of the present invention.
Figure 4A:
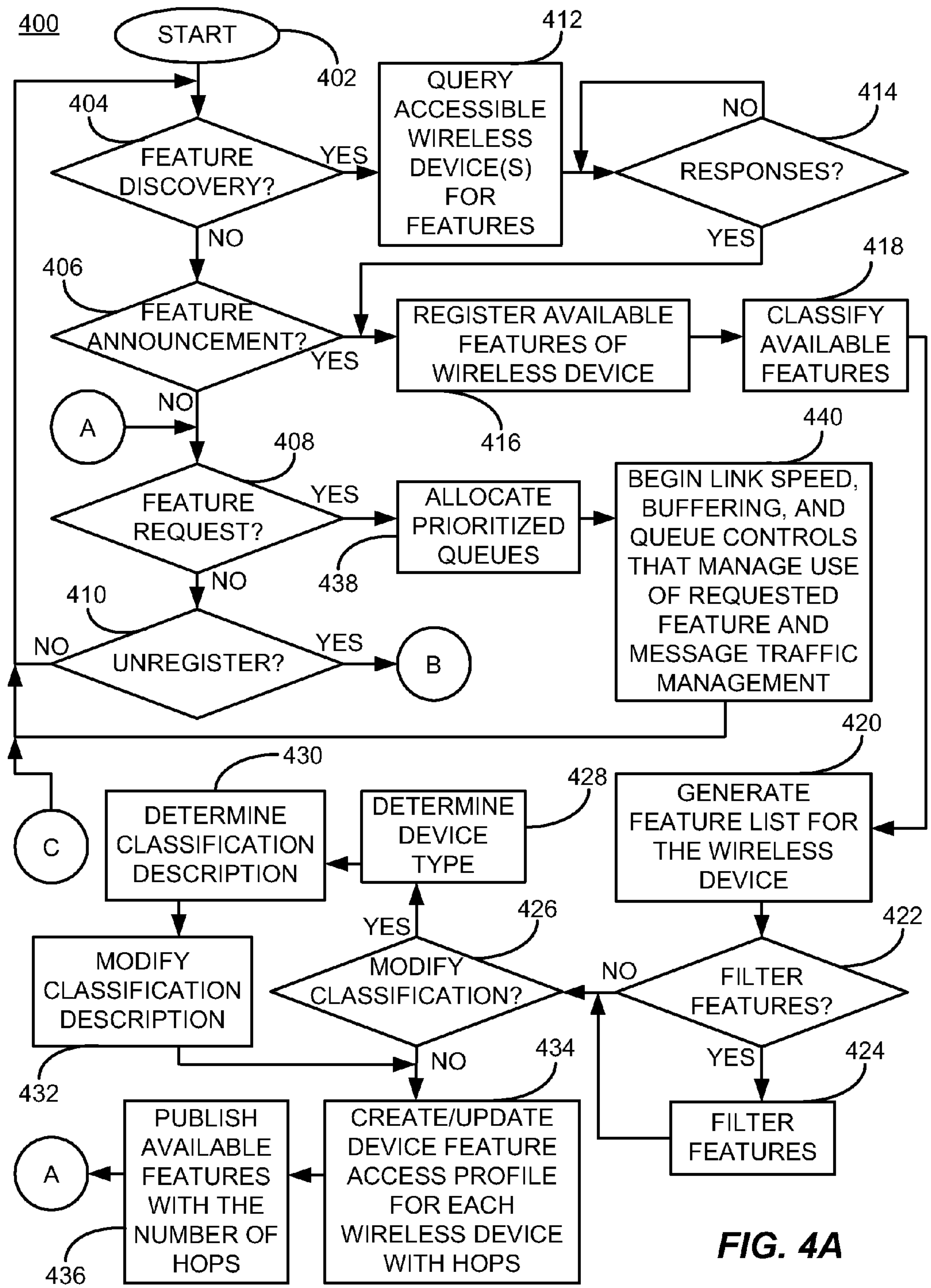
FIG. 4A is a flow chart of an example of an implementation of initial processing of a process for automated multiple concurrent session multi-hop heterogeneous wireless device feature sharing consistent with certain embodiments of the present invention.
Figure 4B:
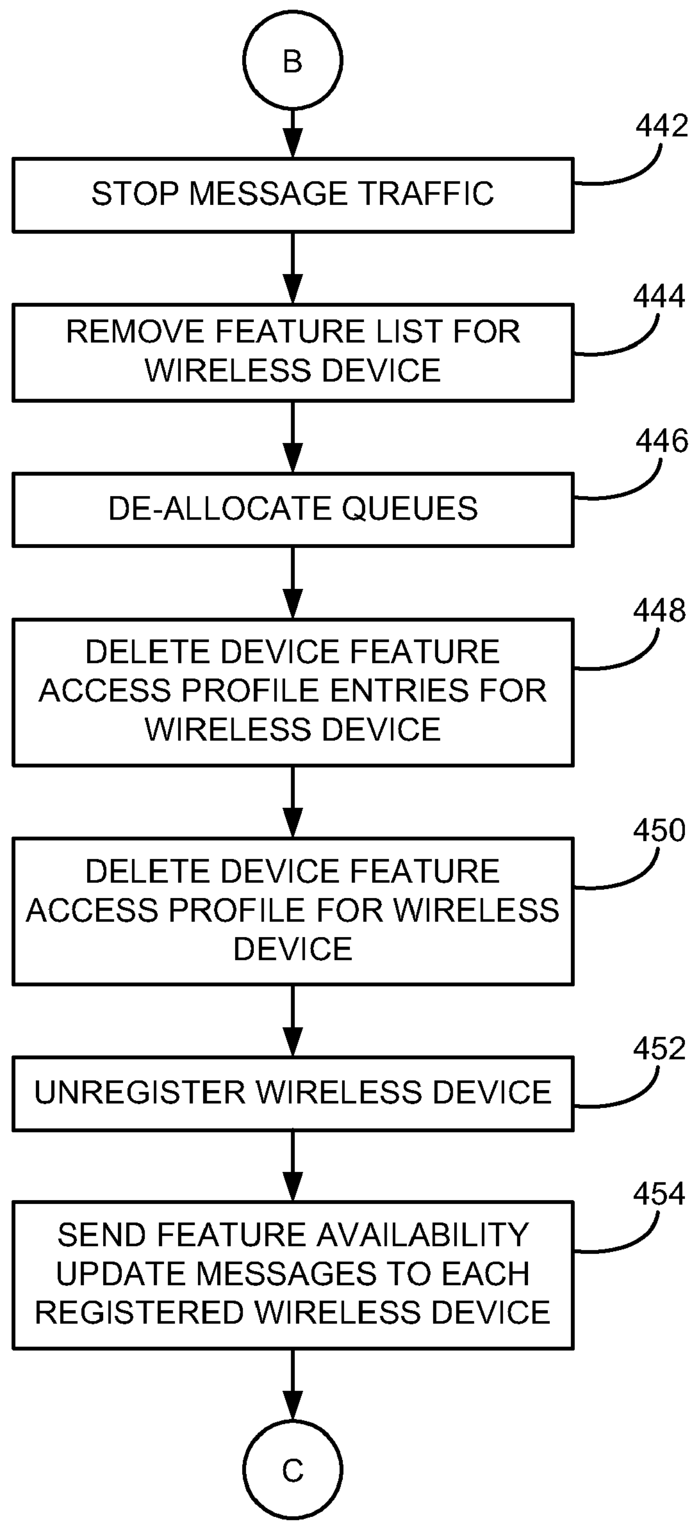
FIG. 4B is a flow chart of an example of an implementation of additional processing of a process for automated multiple concurrent session multi-hop heterogeneous wireless device feature sharing consistent with certain embodiments of the present invention.

FIG. 3 through FIG. 4B below describe example processes that may be executed by such devices, such as the computing device 102, to perform the automated multi-hop heterogeneous wireless device feature sharing associated with the present subject matter. Many other variations on the example processes are possible and all are considered within the scope of the present subject matter. The example processes may be performed by modules, such as the feature sharing module 216 and/or executed by the processor 202, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 that provides automated multi-hop heterogeneous wireless device feature sharing. The process 300 starts at 302. At block 304, the process 300 registers available features of each of a plurality of wireless devices accessible via one of a plurality of different wireless communication protocol interfaces of a first wireless bridging computing device. At block 306, the process 300 receives a request for use of an available feature of a first wireless device via a first wireless communication protocol interface from a second wireless device via a second wireless communication protocol interface. At block 308, the process 300 facilitates use of the requested available feature of the first wireless device by the second wireless device via the first wireless communication protocol interface and the second wireless communication protocol interface in response to the request.

FIGS. 4A-4B illustrate a flow chart of an example of an implementation of a process 400 for automated multiple concurrent session multi-hop heterogeneous wireless device feature sharing. FIG. 4A illustrates initial processing within the process 400. The process 400 starts at 402. At decision point 404, the process 400 begins iterative higher-level processing and makes a determination as to whether to perform feature discovery for any features available at accessible wireless devices. Feature discovery may be performed, for example, in association with startup of a wireless bridging computing device, in association with registering wireless devices for feature sharing, or in response to other feature discovery events.

When a determination is made at decision point 404 not to perform feature discovery, the process 400 makes a determination at decision point 406 as to whether a feature announcement message has been received from any accessible wireless device. As described above, feature announcement messages may be received in association with registration activities for feature sharing, such as for example, when a device comes within range of a wireless bridging computing device or powers on.

When a determination is made at decision point 406 that a feature announcement message has not been received, the process 400 makes a determination at decision point 408 as to whether a feature request has been received from any wireless device that wishes to use a registered and published feature of another accessible wireless device. When a determination is made at decision point 408 that a feature request has not been received, the process 400 makes a determination at decision point 410 as to whether to unregister any registered wireless device. In response to determining not to unregister any wireless device, the process 400 returns to decision point 404 and iterates as described above. Processing associated with a positive determination for each of decision point 404 through decision point 410 will be described below.

Continuing with the description of decision point 404, in response to determining to perform feature discovery, such as via a request from a user of a computing device, such as the computing device 102, or in response to a periodic or scheduled feature discovery request, a power on event, or other event, the process 400 queries each accessible wireless device for available features at block 412. At decision point 414, the process 400 makes a determination as to whether a response has been received for each issued query.

In response to determining that all of the responses for accessible features have been received at decision point 414, or in response to determining that a feature announcement message has been received at decision point 406, the process 400 registers available features of each wireless device from which a feature discovery response and/or a feature announcement message has been received at block 416. At block 418, the process 400 classifies the available features. As described above, a device type may be associated with each separate available feature list to identify a type of device that provides the available features. A classification description of available features from the feature providing device may be transformed based upon a device type of the feature consuming device. At block 420, the process 400 generates a feature list for the wireless device based upon the classified features that were either discovered, or that were received in the feature announcement message and registered for the wireless device from which the feature announcement message was received.

At decision point 422, the process 400 makes a determination as to whether any of the listed features need to be filtered for any other accessible wireless device to which the available features are to be published. As described above, certain features may not be published for consumption by certain wireless devices based upon a variety of criteria, such as bandwidth requirements, number of hops, or other factors. In response to determining to filter features for at least one accessible wireless device, the process 400 filters the available features for each such wireless device at block 424.

In response to completion of filtering the available features for any accessible wireless devices at block 424, or in response to determining not to filter any features at decision point 422, the process 400 makes a determination at decision point 426 as to whether to modify the classification of any of the available features for any accessible wireless device for which the features will be published for consumption. As described above, as one example, a Bluetooth® headset may be reclassified as a handsfree device for a smart phone, such as the smart phone 122, or other device that is capable of using a handsfree device. Such a reclassification may assist a user in recognition and selection of the available features. As such, in response to determining to modify at least one classification for at least one accessible wireless device to which the available features are to be published, the process 400 determines a device type associated with each such accessible wireless device at block 428. At block 430, the process 400 determines the relevant classification description based upon the device type or other criteria. At block 432, the process 400 modifies the classification description as described above.

In response to completion of modifying the classification description for any available feature as appropriate for any accessible wireless device at block 432, or in response to determining not to modify any classification for any accessible wireless device at decision point 426, the process 400 during a first iteration creates a device feature access profile, including the number of hops to each available feature, for each accessible wireless device for which the available features are to be published at block 434. It should be noted that during subsequent iterations of the process 400, a device feature access profile may already exist for one or more accessible wireless devices and such device feature access profiles may be updated with the new available features of the newly registered wireless device. At block 436, the process 400 publishes the available features, with the number of hops to each available feature, to each accessible wireless device that may consume the newly registered features. Publication of the available features may include sending a message to each accessible wireless device that includes the feature access profile for each such wireless device. The process 400 returns to decision point 408 and iterates as described above and in more detail below.

Returning to the description of decision point 408, in response to determining that a feature request has been received for use of a published available feature, the process 400 allocates prioritized queues as appropriate for message traffic management for feature sharing at block 438. At block 440, the process 400 begins link speed, buffering, and queue controls that manage use of the requested feature, and begins message traffic management. As described above, multiple uni-directional or bi-directional simultaneous and concurrent feature sharing sessions may be active. As such, processing to determine an end of any given feature sharing is omitted to reduce complexity in the drawing figure and for ease of illustration purposes. However, it is understood that multiple simultaneous and concurrent feature sharing sessions may be started and stopped asynchronously and independently of one another. The process 400 returns to decision point 404 and iterates as described above.

Returning to the description of decision point 410, in response to determining to unregister any registered feature sharing wireless device, such as upon recognition or detection of a power down condition or a signal loss condition associated with a previously accessible registered wireless device, or in response to an unregister request message from any accessible wireless device, the process 400 transitions to the processing shown and described in association with FIG. 4B.

FIG. 4B illustrates additional processing associated with the process 400 for automated multiple concurrent session multi-hop heterogeneous wireless device feature sharing. At block 442, the process 400 stops message traffic associated with any allocated feature sharing session. At block 444, the process 400 removes the feature list for the wireless device that is to be unregistered. At block 446, the process 400 de-allocates any allocated message queues associated with feature sharing for the respective wireless device. At block 448, the process 400 deletes device feature access profile entries within any device feature access profile that includes features that were previously available from the respective wireless device. At block 450, the process 400 deletes the device feature access profile for the wireless device that is to be unregistered. At block 452, the process 400 unregisters the wireless device for feature sharing. At block 454, the process 400 sends a feature availability update message to each registered wireless device with, for example, the updated feature access profile of each such device to notify each such device of the change to the available features. The process 400 then returns to decision point 404 and iterates as described above.

As such, the process 400 registers wireless devices for feature sharing by performing feature discovery, either at startup or in response to a feature discovery event, or in response to feature announcement messages received from wireless device. The process 400 generates a feature list for each registered wireless device and creates or updates a device feature access profile for each other accessible wireless device in response to each registration or unregistration of a wireless device for feature sharing. Classification descriptions of features may be filtered or modified as appropriate for a given implementation. Feature filtering may be implemented, for example, to avoid publication of features that may not be consumed by a given accessible wireless device due to bandwidth or other factors. Classification description modification may be performed, for example, to provide a different feature identifier associated with an available feature that may be more meaningful within a product domain of a consuming wireless device. Many other variations on the processing described are possible and all are considered within the scope of the present subject matter.

Thus, in accord with certain implementations, a method of sharing device features via multi-hop communications across different wireless radio interfaces involves registering available features of each of a plurality of wireless devices accessible via one of a plurality of different wireless communication protocol interfaces of a first wireless bridging computing device; receiving a request for use of an available feature of a first wireless device via a first wireless communication protocol interface from a second wireless device via a second wireless communication protocol interface; and facilitating use of the requested available feature of the first wireless device by the second wireless device via the first wireless communication protocol interface and the second wireless communication protocol interface in response to the request.

In certain implementations, the method of sharing device features via multi-hop communications across different wireless radio interfaces further involves publishing the available features of each of the registered wireless devices to each other of the plurality of wireless devices. In certain implementations, the method of publishing the available features of each of the plurality of wireless devices to each other of the plurality of wireless devices involves publishing a number of wireless device hops to each published available feature. In certain implementations, the method further involves filtering the available features of the first wireless device to remove at least one available feature un-useable by the second wireless device; and the method of publishing the available features of each of the plurality of wireless devices to each other of the plurality of wireless devices involves, for the second wireless device, publishing the filtered available features. In certain implementations, the method of filtering the available features of the first wireless device to remove the at least one available feature un-useable by the second wireless device involves filtering the available features of the first wireless device based upon bandwidth requirements for the available feature. In certain implementations, the method further involves receiving a feature announcement message from each of the plurality of wireless devices; and the method of registering the available features of each of the plurality of wireless devices accessible via the one of the plurality of different wireless communication protocol interfaces of the first wireless bridging computing device involves registering the available features of each of the plurality of wireless devices in response to receipt of the feature announcement message from each of the plurality of wireless devices. In certain implementations, the feature announcement message received from each of the plurality of wireless devices includes a number of wireless hops to each available feature. In certain implementations, the method of registering the available features of each of the plurality of wireless devices accessible via the one of the plurality of different wireless communication protocol interfaces of the first wireless bridging computing device involves performing feature discovery for each of the plurality of wireless devices; and classifying each discovered feature. In certain implementations, the method of performing the feature discovery for each of the plurality of wireless devices involves querying each of the plurality of wireless devices for the available features of each of the plurality of wireless devices; and receiving a response message from each of the plurality of wireless devices including the available features and a number of wireless hops to each available feature. In certain implementations, the method of classifying each discovered feature involves creating a classification description of each discovered feature and the method further involves modifying the classification description of at least one discovered feature. In certain implementations, the method further involves determining that a device type associated with one of the plurality of wireless devices includes a wireless telephone device; determining that the classification description of the at least one discovered feature includes a Bluetooth headset classification description; and the method of modifying the classification description of the at least one discovered feature involves modifying a classification description of the Bluetooth headset classification description to a handsfree headset classification description for the wireless telephone device. In certain implementations, the method further involves generating, for each of the plurality of wireless devices, an available feature list including the available features of the wireless device. In certain implementations, the method further involves generating, for each of the plurality of wireless devices, a device feature access profile including the available features of other of the plurality of wireless devices useable by the wireless device. In certain implementations, the method of registering the available features of each of the plurality of wireless devices accessible via the one of the plurality of different wireless communication protocol interfaces of the first wireless bridging computing device involves registering each of the plurality of wireless devices for feature sharing. In certain implementations, the first wireless device includes a second wireless bridging computing device and the requested available feature includes a feature of a third wireless device registered with the second wireless bridging device that is not accessible via the first wireless bridging computing device. In certain implementations, each of the available features of each of the plurality of wireless devices include at least one of a Bluetooth headset feature, a memory storage feature, an Internet access feature, a camera feature, and a telephone communication feature. In certain implementations, the method of facilitating use of the requested available feature of the first wireless device by the second wireless device via the first wireless communication protocol interface and the second wireless communication protocol interface in response to the request involves forwarding data packets associated with the requested available feature between the first wireless device via the first wireless communication protocol interface and the second wireless device via the second wireless communication protocol interface. In certain implementations, the method of forwarding the data packets associated with the requested available feature between the first wireless device via the first wireless communication protocol interface and the second wireless device via the second wireless communication protocol interface involves forwarding the data packets via a virtual Internet protocol (IP) bridging network layer of the first wireless bridging computing device. In certain implementations, the virtual IP bridging network layer operates above a first IP stack associated with the first wireless communication protocol interface, operates above a second IP stack associated with the second wireless communication protocol interface, and operates below a transmission control protocol (TCP) stack of the first wireless bridging computing device. In certain implementations, the first wireless communication protocol interface and the second wireless communication protocol interface include asymmetric links and the method of facilitating use of the requested available feature of the first wireless device by the second wireless device via the first wireless communication protocol interface and the second wireless communication protocol interface in response to the request involves performing link speed, buffering, and queue controls that manage use of the requested available feature between the asymmetric links. In certain implementations, the method of facilitating use of the requested available feature of the first wireless device by the second wireless device via the first wireless communication protocol interface and the second wireless communication protocol interface in response to the request involves coordinating communications between the first wireless device and the second wireless device via one of a helper protocol conversion layer and a helper application of the first wireless bridging computing device. In certain implementations, the method of facilitating use of the requested available feature of the first wireless device by the second wireless device via the first wireless communication protocol interface and the second wireless communication protocol interface in response to the request involves providing a two-way communications interface between the first wireless device and the second wireless device via the first wireless communication protocol interface and the second wireless communication protocol interface. In certain implementations, the method of providing the two-way communications interface between the first wireless device and the second wireless device via the first wireless communication protocol interface and the second wireless communication protocol interface involves allocating a plurality of prioritized outbound message queues for each of the first wireless communication protocol interface and the second wireless communication protocol interface; and performing message traffic management via the plurality of prioritized outbound message queues for each of the first wireless communication protocol interface and the second wireless communication protocol interface. In certain implementations, the plurality of prioritized outbound message queues for each of the first wireless communication protocol interface and the second wireless communication protocol interface includes at least two of an audio output queue, a video output queue, and a data storage output queue. In certain implementations, the method of facilitating use of the requested available feature of the first wireless device by the second wireless device via the first wireless communication protocol interface and the second wireless communication protocol interface in response to the request involves providing a plurality of concurrent feature sharing sessions between pairs of the plurality of wireless devices.

In another implementation, a computer readable storage medium may store instructions which, when executed on one or more programmed processors, carry out a process of registering available features of each of a plurality of wireless devices accessible via one of a plurality of different wireless communication protocol interfaces of a first wireless bridging computing device; receiving a request for use of an available feature of a first wireless device via a first wireless communication protocol interface from a second wireless device via a second wireless communication protocol interface; and facilitating use of the requested available feature of the first wireless device by the second wireless device via the first wireless communication protocol interface and the second wireless communication protocol interface in response to the request.

In certain implementations, a method of sharing device features via multi-hop communications across different wireless radio interfaces involves registering available features of each of a plurality of wireless devices accessible via one of a plurality of different wireless communication protocol interfaces of a first wireless bridging computing device; generating, for each of the plurality of wireless devices, an available feature list including the available features of the wireless device; generating, for each of the plurality of wireless devices, a device feature access profile including the available features of other of the plurality of wireless devices useable by the wireless device; publishing each device feature access profile to the wireless device for which each device feature access profile was generated; receiving a request for use of an available feature of a first wireless device via a first wireless communication protocol interface from a second wireless device via a second wireless communication protocol interface; and facilitating use of the requested available feature of the first wireless device by the second wireless device via the first wireless communication protocol interface and the second wireless communication protocol interface in response to the request, involving allocating a plurality of prioritized outbound message queues for each of the first wireless communication protocol interface and the second wireless communication protocol interface; and performing message traffic management via the plurality of prioritized outbound message queues for each of the first wireless communication protocol interface and the second wireless communication protocol interface.

In another implementation, a computer readable storage medium may store instructions which, when executed on one or more programmed processors, carry out a process of registering available features of each of a plurality of wireless devices accessible via one of a plurality of different wireless communication protocol interfaces of a first wireless bridging computing device; generating, for each of the plurality of wireless devices, an available feature list including the available features of the wireless device; generating, for each of the plurality of wireless devices, a device feature access profile including the available features of other of the plurality of wireless devices useable by the wireless device; publishing each device feature access profile to the wireless device for which each device feature access profile was generated; receiving a request for use of an available feature of a first wireless device via a first wireless communication protocol interface from a second wireless device via a second wireless communication protocol interface; and facilitating use of the requested available feature of the first wireless device by the second wireless device via the first wireless communication protocol interface and the second wireless communication protocol interface in response to the request, involving allocating a plurality of prioritized outbound message queues for each of the first wireless communication protocol interface and the second wireless communication protocol interface; and performing message traffic management via the plurality of prioritized outbound message queues for each of the first wireless communication protocol interface and the second wireless communication protocol interface.

A device for sharing device features via multi-hop communications across different wireless radio interfaces consistent with certain implementations has a plurality of different wireless communication protocol interfaces; and a processor programmed to register available features of each of a plurality of wireless devices accessible via one of the plurality of different wireless communication protocol interfaces; receive a request for use of an available feature of a first wireless device via a first wireless communication protocol interface from a second wireless device via a second wireless communication protocol interface; and facilitate use of the requested available feature of the first wireless device by the second wireless device via the first wireless communication protocol interface and the second wireless communication protocol interface in response to the request.

In certain implementations, the processor is further programmed to publish the available features of each of the registered wireless devices to each other of the plurality of wireless devices. In certain implementations, in being programmed to publish the available features of each of the plurality of wireless devices to each other of the plurality of wireless devices, the processor is programmed to publish a number of wireless device hops to each published available feature. In certain implementations, the processor is further programmed to filter the available features of the first wireless device to remove at least one available feature un-useable by the second wireless device; and, in being programmed to publish the available features of each of the plurality of wireless devices to each other of the plurality of wireless devices, the processor is programmed to, for the second wireless device, publish the filtered available features. In certain implementations, in being programmed to filter the available features of the first wireless device to remove the at least one available feature un-useable by the second wireless device, the processor is programmed to filter the available features of the first wireless device based upon bandwidth requirements for the available feature. In certain implementations, the processor is further programmed to receive a feature announcement message from each of the plurality of wireless devices; and, in being programmed to register the available features of each of the plurality of wireless devices accessible via the one of the plurality of different wireless communication protocol interfaces, the processor is programmed to register the available features of each of the plurality of wireless devices in response to receipt of the feature announcement message from each of the plurality of wireless devices. In certain implementations, the feature announcement message received from each of the plurality of wireless devices includes a number of wireless hops to each available feature. In certain implementations, in being programmed to register the available features of each of the plurality of wireless devices accessible via the one of the plurality of different wireless communication protocol interfaces, the processor is programmed to perform feature discovery for each of the plurality of wireless devices; and classify each discovered feature. In certain implementations, in being programmed to perform the feature discovery for each of the plurality of wireless devices, the processor is programmed to query each of the plurality of wireless devices for the available features of each of the plurality of wireless devices; and receive a response message from each of the plurality of wireless devices including the available features and a number of wireless hops to each available feature. In certain implementations, in being programmed to classify each discovered feature, the processor is programmed to create a classification description of each discovered feature and where the processor is further programmed to modify the classification description of at least one discovered feature. In certain implementations, the processor is further programmed to determine that a device type associated with one of the plurality of wireless devices includes a wireless telephone device; determine that the classification description of the at least one discovered feature includes a Bluetooth headset classification description; and, in being programmed to modify the classification description of the at least one discovered feature, the processor is programmed to modify a classification description of the Bluetooth headset classification description to a handsfree headset classification description for the wireless telephone device. In certain implementations, the processor is further programmed to generate, for each of the plurality of wireless devices, an available feature list including the available features of the wireless device. In certain implementations, the processor is further programmed to generate, for each of the plurality of wireless devices, a device feature access profile including the available features of other of the plurality of wireless devices useable by the wireless device. In certain implementations, in being programmed to register the available features of each of the plurality of wireless devices accessible via the one of the plurality of different wireless communication protocol interfaces, the processor is programmed to register each of the plurality of wireless devices for feature sharing. In certain implementations, each of the available features of each of the plurality of wireless devices include at least one of a Bluetooth headset feature, a memory storage feature, an Internet access feature, a camera feature, and a telephone communication feature. In certain implementations, in being programmed to facilitate use of the requested available feature of the first wireless device by the second wireless device via the first wireless communication protocol interface and the second wireless communication protocol interface in response to the request, the processor is programmed to forward data packets associated with the requested available feature between the first wireless device via the first wireless communication protocol interface and the second wireless device via the second wireless communication protocol interface. In certain implementations, in being programmed to forward the data packets associated with the requested available feature between the first wireless device via the first wireless communication protocol interface and the second wireless device via the second wireless communication protocol interface, the processor is programmed to forward the data packets via a virtual Internet protocol (IP) bridging network layer. In certain implementations, the virtual IP bridging network layer operates above a first IP stack associated with the first wireless communication protocol interface, operates above a second IP stack associated with the second wireless communication protocol interface, and operates below a transmission control protocol (TCP) stack. In certain implementations, the first wireless communication protocol interface and the second wireless communication protocol interface include asymmetric links and, in being programmed to facilitate use of the requested available feature of the first wireless device by the second wireless device via the first wireless communication protocol interface and the second wireless communication protocol interface in response to the request, the processor is programmed to perform link speed, buffering, and queue controls that manage use of the requested available feature between the asymmetric links. In certain implementations, in being programmed to facilitate use of the requested available feature of the first wireless device by the second wireless device via the first wireless communication protocol interface and the second wireless communication protocol interface in response to the request, the processor is programmed to coordinate communications between the first wireless device and the second wireless device via one of a helper protocol conversion layer and a helper application. In certain implementations, in being programmed to facilitate use of the requested available feature of the first wireless device by the second wireless device via the first wireless communication protocol interface and the second wireless communication protocol interface in response to the request, the processor is programmed to provide a two-way communications interface between the first wireless device and the second wireless device via the first wireless communication protocol interface and the second wireless communication protocol interface. In certain implementations, in being programmed to provide the two-way communications interface between the first wireless device and the second wireless device via the first wireless communication protocol interface and the second wireless communication protocol interface, the processor is programmed to allocate a plurality of prioritized outbound message queues for each of the first wireless communication protocol interface and the second wireless communication protocol interface; and perform message traffic management via the plurality of prioritized outbound message queues for each of the first wireless communication protocol interface and the second wireless communication protocol interface. In certain implementations, the plurality of prioritized outbound message queues for each of the first wireless communication protocol interface and the second wireless communication protocol interface includes at least two of an audio output queue, a video output queue, and a data storage output queue. In certain implementations, in being programmed to facilitate use of the requested available feature of the first wireless device by the second wireless device via the first wireless communication protocol interface and the second wireless communication protocol interface in response to the request, the processor is programmed to provide a plurality of concurrent feature sharing sessions between pairs of the plurality of wireless devices.

A device for sharing device features via multi-hop communications across different wireless radio interfaces consistent with certain implementations has a plurality of different wireless communication protocol interfaces; and a processor programmed to register available features of each of a plurality of wireless devices accessible via one of a plurality of different wireless communication protocol interfaces; generate, for each of the plurality of wireless devices, an available feature list including the available features of the wireless device; generate, for each of the plurality of wireless devices, a device feature access profile including the available features of other of the plurality of wireless devices useable by the wireless device; publish each device feature access profile to the wireless device for which each device feature access profile was generated; receive a request for use of an available feature of a first wireless device via a first wireless communication protocol interface from a second wireless device via a second wireless communication protocol interface; and facilitate use of the requested available feature of the first wireless device by the second wireless device via the first wireless communication protocol interface and the second wireless communication protocol interface in response to the request, and the processor is further programmed to allocate a plurality of prioritized outbound message queues for each of the first wireless communication protocol interface and the second wireless communication protocol interface; and perform message traffic management via the plurality of prioritized outbound message queues for each of the first wireless communication protocol interface and the second wireless communication protocol interface.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of sharing device features via multi-hop communications across different wireless radio interfaces, comprising:

registering available features of each of a plurality of wireless devices accessible via one of a plurality of different wireless communication protocol interfaces of a first wireless bridging computing device;

receiving a request for use of an available feature of a first wireless device via a first wireless communication protocol interface from a second wireless device via a second wireless communication protocol interface;

facilitating use of the requested available feature of the first wireless device by the second wireless device via the first wireless communication protocol interface and the second wireless communication protocol interface in response to the request;

publishing the available features of each of the registered wireless devices to each other of the plurality of wireless devices;

filtering the available features of the first wireless device to remove at least one available feature un-useable by the second wireless device, where filtering the available features of the first wireless device to remove the at least one available feature un-useable by the second wireless device comprises filtering the available features of the first wireless device based upon bandwidth requirements for the available feature; and where publishing the available features of each of the plurality of wireless devices to each other of the plurality of wireless devices comprises, for the second wireless device, publishing the filtered available features.

2. The method according to claim 1, where publishing the available features of each of the plurality of wireless devices to each other of the plurality of wireless devices comprises publishing a number of wireless device hops to each published available feature.

3. The method according to claim 1, further comprising:

receiving a feature announcement message from each of the plurality of wireless devices; and where registering the available features of each of the plurality of wireless devices accessible via the one of the plurality of different wireless communication protocol interfaces of the first wireless bridging computing device comprises registering the available features of each of the plurality of wireless devices in response to receipt of the feature announcement message from each of the plurality of wireless devices.

4. The method according to claim 3, where the feature announcement message received from each of the plurality of wireless devices comprises a number of wireless hops to each available feature.

5. The method according to claim 1, where registering the available features of each of the plurality of wireless devices accessible via the one of the plurality of different wireless communication protocol interfaces of the first wireless bridging computing device comprises:

performing feature discovery for each of the plurality of wireless devices; and classifying each discovered feature.

6. The method according to claim 5, where performing the feature discovery for each of the plurality of wireless devices comprises:

querying each of the plurality of wireless devices for the available features of each of the plurality of wireless devices; and receiving a response message from each of the plurality of wireless devices comprising the available features and a number of wireless hops to each available feature.

7. The method according to claim 5, where classifying each discovered feature comprises creating a classification description of each discovered feature and further comprising modifying the classification description of at least one discovered feature.

8. The method according to claim 7, further comprising:

determining that a device type associated with one of the plurality of wireless devices comprises a wireless telephone device;

determining that the classification description of the at least one discovered feature comprises a Bluetooth headset classification description; and where modifying the classification description of the at least one discovered feature comprises modifying a classification description of the Bluetooth headset classification description to a handsfree headset classification description for the wireless telephone device.

9. The method according to claim 1, further comprising generating, for each of the plurality of wireless devices, an available feature list comprising the available features of the wireless device.

10. The method according to claim 9, further comprising generating, for each of the plurality of wireless devices, a device feature access profile comprising the available features of other of the plurality of wireless devices useable by the wireless device.

11. The method according to claim 1, where registering the available features of each of the plurality of wireless devices accessible via the one of the plurality of different wireless communication protocol interfaces of the first wireless bridging computing device comprises registering each of the plurality of wireless devices for feature sharing.

12. The method according to claim 1, where the first wireless device comprises a second wireless bridging computing device and the requested available feature comprises a feature of a third wireless device registered with the second wireless bridging device that is not accessible via the first wireless bridging computing device.

13. The method according to claim 1, where each of the available features of each of the plurality of wireless devices comprise at least one of a Bluetooth headset feature, a memory storage feature, an Internet access feature, a camera feature, and a telephone communication feature.

14. The method according to claim 1, where facilitating use of the requested available feature of the first wireless device by the second wireless device via the first wireless communication protocol interface and the second wireless communication protocol interface in response to the request comprises forwarding data packets associated with the requested available feature between the first wireless device via the first wireless communication protocol interface and the second wireless device via the second wireless communication protocol interface.

15. The method according to claim 14, where forwarding the data packets associated with the requested available feature between the first wireless device via the first wireless communication protocol interface and the second wireless device via the second wireless communication protocol interface comprises forwarding the data packets via a virtual Internet protocol (IP) bridging network layer of the first wireless bridging computing device.

16. The method according to claim 15, where the virtual IP bridging network layer operates above a first IP stack associated with the first wireless communication protocol interface, operates above a second IP stack associated with the second wireless communication protocol interface, and operates below a transmission control protocol (TCP) stack of the first wireless bridging computing device.

17. The method according to claim 1, where the first wireless communication protocol interface and the second wireless communication protocol interface comprise asymmetric links and where facilitating use of the requested available feature of the first wireless device by the second wireless device via the first wireless communication protocol interface and the second wireless communication protocol interface in response to the request comprises:

performing link speed, buffering, and queue controls that manage use of the requested available feature between the asymmetric links.

18. The method according to claim 1, where facilitating use of the requested available feature of the first wireless device by the second wireless device via the first wireless communication protocol interface and the second wireless communication protocol interface in response to the request comprises coordinating communications between the first wireless device and the second wireless device via one of a helper protocol conversion layer and a helper application of the first wireless bridging computing device.

19. The method according to claim 1, where facilitating use of the requested available feature of the first wireless device by the second wireless device via the first wireless communication protocol interface and the second wireless communication protocol interface in response to the request comprises:

providing a two-way communications interface between the first wireless device and the second wireless device via the first wireless communication protocol interface and the second wireless communication protocol interface.

20. The method according to claim 19, where providing the two-way communications interface between the first wireless device and the second wireless device via the first wireless communication protocol interface and the second wireless communication protocol interface comprises:

allocating a plurality of prioritized outbound message queues for each of the first wireless communication protocol interface and the second wireless communication protocol interface; and performing message traffic management via the plurality of prioritized outbound message queues for each of the first wireless communication protocol interface and the second wireless communication protocol interface.

21. The method according to claim 20, where the plurality of prioritized outbound message queues for each of the first wireless communication protocol interface and the second wireless communication protocol interface comprises at least two of an audio output queue, a video output queue, and a data storage output queue.

22. The method according to claim 1, where facilitating use of the requested available feature of the first wireless device by the second wireless device via the first wireless communication protocol interface and the second wireless communication protocol interface in response to the request comprises:

providing a plurality of concurrent feature sharing sessions between pairs of the plurality of wireless devices.

23. A non-transitory computer readable storage medium storing instructions which, when executed on one or more programmed processors, carry out a method according to claim 1.

24. A method of sharing device features via multi-hop communications across different wireless radio interfaces, comprising:

registering available features of each of a plurality of wireless devices accessible via one of a plurality of different wireless communication protocol interfaces of a first wireless bridging computing device;

generating, for each of the plurality of wireless devices, an available feature list comprising the available features of the wireless device;

generating, for each of the plurality of wireless devices, a device feature access profile comprising the available features of other of the plurality of wireless devices useable by the wireless device;

publishing each device feature access profile to the wireless device for which each device feature access profile was generated;

receiving a request for use of an available feature of a first wireless device via a first wireless communication protocol interface from a second wireless device via a second wireless communication protocol interface;

where the publishing comprises publishing the available features of each of the registered wireless devices to each other of the plurality of wireless devices;

filtering the available features of the first wireless device to remove at least one available feature un-useable by the second wireless device, where filtering the available features of the first wireless device to remove the at least one available feature un-useable by the second wireless device comprises filtering the available features of the first wireless device based upon bandwidth requirements for the available feature;

where publishing the available features of each of the plurality of wireless devices to each other of the plurality of wireless devices comprises, for the second wireless device, publishing the filtered available features; and facilitating use of the requested available feature of the first wireless device by the second wireless device via the first wireless communication protocol interface and the second wireless communication protocol interface in response to the request, comprising:

allocating a plurality of prioritized outbound message queues for each of the first wireless communication protocol interface and the second wireless communication protocol interface; and performing message traffic management via the plurality of prioritized outbound message queues for each of the first wireless communication protocol interface and the second wireless communication protocol interface.

25. A non-transitory computer readable storage medium storing instructions which, when executed on one or more programmed processors, carry out a method according to claim 24.

26. An apparatus for sharing device features via multi-hop communications across different wireless radio interfaces, comprising:

a plurality of different wireless communication protocol interfaces; and a processor programmed to:

register available features of each of a plurality of wireless devices accessible via one of the plurality of different wireless communication protocol interfaces;

receive a request for use of an available feature of a first wireless device via a first wireless communication protocol interface from a second wireless device via a second wireless communication protocol interface;

facilitate use of the requested available feature of the first wireless device by the second wireless device via the first wireless communication protocol interface and the second wireless communication protocol interface in response to the request;

publish the available features of each of the registered wireless devices to each other of the plurality of wireless devices;

filter the available features of the first wireless device to remove at least one available feature un-useable by the second wireless device;

where, in being programmed to publish the available features of each of the plurality of wireless devices to each other of the plurality of wireless devices, the processor is programmed to, for the second wireless device, publish the filtered available features based upon bandwidth requirements for the available feature.

27. The apparatus according to claim 26, where, in being programmed to publish the available features of each of the plurality of wireless devices to each other of the plurality of wireless devices, the processor is programmed to publish a number of wireless device hops to each published available feature.

28. The apparatus according to claim 26, where the processor is further programmed to:

receive a feature announcement message from each of the plurality of wireless devices; and where, in being programmed to register the available features of each of the plurality of wireless devices accessible via the one of the plurality of different wireless communication protocol interfaces, the processor is programmed to register the available features of each of the plurality of wireless devices in response to receipt of the feature announcement message from each of the plurality of wireless devices.

29. The apparatus according to claim 28, where the feature announcement message received from each of the plurality of wireless devices comprises a number of wireless hops to each available feature.

30. The apparatus according to claim 26, where, in being programmed to register the available features of each of the plurality of wireless devices accessible via the one of the plurality of different wireless communication protocol interfaces, the processor is programmed to:

perform feature discovery for each of the plurality of wireless devices; and classify each discovered feature.

31. The apparatus according to claim 30, where, in being programmed to perform the feature discovery for each of the plurality of wireless devices, the processor is programmed to:

query each of the plurality of wireless devices for the available features of each of the plurality of wireless devices; and receive a response message from each of the plurality of wireless devices comprising the available features and a number of wireless hops to each available feature.

32. The apparatus according to claim 30, where, in being programmed to classify each discovered feature, the processor is programmed to create a classification description of each discovered feature and where the processor is further programmed to modify the classification description of at least one discovered feature.

33. The apparatus according to claim 32, where the processor is further programmed to:

determine that a device type associated with one of the plurality of wireless devices comprises a wireless telephone device;

determine that the classification description of the at least one discovered feature comprises a Bluetooth headset classification description; and where, in being programmed to modify the classification description of the at least one discovered feature, the processor is programmed to modify a classification description of the Bluetooth headset classification description to a handsfree headset classification description for the wireless telephone device.

34. The apparatus according to claim 33, where the processor is further programmed to generate, for each of the plurality of wireless devices, an available feature list comprising the available features of the wireless device.

35. The apparatus according to claim 34, where the processor is further programmed to generate, for each of the plurality of wireless devices, a device feature access profile comprising the available features of other of the plurality of wireless devices useable by the wireless device.

36. The apparatus according to claim 26, where, in being programmed to register the available features of each of the plurality of wireless devices accessible via the one of the plurality of different wireless communication protocol interfaces, the processor is programmed to register each of the plurality of wireless devices for feature sharing.

37. The apparatus according to claim 26, where each of the available features of each of the plurality of wireless devices comprise at least one of a Bluetooth headset feature, a memory storage feature, an Internet access feature, a camera feature, and a telephone communication feature.

38. The apparatus according to claim 26, where, in being programmed to facilitate use of the requested available feature of the first wireless device by the second wireless device via the first wireless communication protocol interface and the second wireless communication protocol interface in response to the request, the processor is programmed to forward data packets associated with the requested available feature between the first wireless device via the first wireless communication protocol interface and the second wireless device via the second wireless communication protocol interface.

39. The apparatus according to claim 38, where, in being programmed to forward the data packets associated with the requested available feature between the first wireless device via the first wireless communication protocol interface and the second wireless device via the second wireless communication protocol interface, the processor is programmed to forward the data packets via a virtual Internet protocol (IP) bridging network layer.

40. The apparatus according to claim 39, where the virtual IP bridging network layer operates above a first IP stack associated with the first wireless communication protocol interface, operates above a second IP stack associated with the second wireless communication protocol interface, and operates below a transmission control protocol (TCP) stack.

41. The apparatus according to claim 26, where the first wireless communication protocol interface and the second wireless communication protocol interface comprise asymmetric links and where, in being programmed to facilitate use of the requested available feature of the first wireless device by the second wireless device via the first wireless communication protocol interface and the second wireless communication protocol interface in response to the request, the processor is programmed to:

perform link speed, buffering, and queue controls that manage use of the requested available feature between the asymmetric links.

42. The apparatus according to claim 26, where, in being programmed to facilitate use of the requested available feature of the first wireless device by the second wireless device via the first wireless communication protocol interface and the second wireless communication protocol interface in response to the request, the processor is programmed to coordinate communications between the first wireless device and the second wireless device via one of a helper protocol conversion layer and a helper application.

43. The apparatus according to claim 26, where, in being programmed to facilitate use of the requested available feature of the first wireless device by the second wireless device via the first wireless communication protocol interface and the second wireless communication protocol interface in response to the request, the processor is programmed to:

provide a two-way communications interface between the first wireless device and the second wireless device via the first wireless communication protocol interface and the second wireless communication protocol interface.

44. The apparatus according to claim 43, where, in being programmed to provide the two-way communications interface between the first wireless device and the second wireless device via the first wireless communication protocol interface and the second wireless communication protocol interface, the processor is programmed to:

allocate a plurality of prioritized outbound message queues for each of the first wireless communication protocol interface and the second wireless communication protocol interface; and perform message traffic management via the plurality of prioritized outbound message queues for each of the first wireless communication protocol interface and the second wireless communication protocol interface.

45. The apparatus according to claim 44, where the plurality of prioritized outbound message queues for each of the first wireless communication protocol interface and the second wireless communication protocol interface comprises at least two of an audio output queue, a video output queue, and a data storage output queue.

46. The apparatus according to claim 26, where, in being programmed to facilitate use of the requested available feature of the first wireless device by the second wireless device via the first wireless communication protocol interface and the second wireless communication protocol interface in response to the request, the processor is programmed to:

provide a plurality of concurrent feature sharing sessions between pairs of the plurality of wireless devices.

47. An apparatus for sharing device features via multi-hop communications across different wireless radio interfaces, comprising:

a plurality of different wireless communication protocol interfaces; and a processor programmed to:

register available features of each of a plurality of wireless devices accessible via one of a plurality of different wireless communication protocol interfaces;

generate, for each of the plurality of wireless devices, an available feature list comprising the available features of the wireless device;

generate, for each of the plurality of wireless devices, a device feature access profile comprising the available features of other of the plurality of wireless devices useable by the wireless device;

publish each device feature access profile to the wireless device for which each device feature access profile was generated;

receive a request for use of an available feature of a first wireless device via a first wireless communication protocol interface from a second wireless device via a second wireless communication protocol interface;

publish the available features of each of the registered wireless devices to each other of the plurality of wireless devices;

filter the available features of the first wireless device to remove at least one available feature un-useable by the second wireless device, where filtering the available features of the first wireless device to remove the at least one available feature un-useable by the second wireless device comprises filtering the available features of the first wireless device based upon bandwidth requirements for the available feature;

where in being programmed to publish the available features of each of the plurality of wireless devices to each other of the plurality of wireless devices the processor is programmed to, for the second wireless device, publishing the filtered available features;

facilitate use of the requested available feature of the first wireless device by the second wireless device via the first wireless communication protocol interface and the second wireless communication protocol interface in response to the request, where the processor is further programmed to:

allocate a plurality of prioritized outbound message queues for each of the first wireless communication protocol interface and the second wireless communication protocol interface; and perform message traffic management via the plurality of prioritized outbound message queues for each of the first wireless communication protocol interface and the second wireless communication protocol interface.

* * * * *